United States Patent
Ikeda et al.

(10) Patent No.: US 9,766,458 B2
(45) Date of Patent: Sep. 19, 2017

(54) IMAGE GENERATING SYSTEM, IMAGE GENERATING METHOD, AND INFORMATION STORAGE MEDIUM

(71) Applicant: Sony Computer Entertainment Inc., Tokyo (JP)

(72) Inventors: Takakazu Ikeda, Tokyo (JP); Takashi Yamamoto, Tokyo (JP); Atsushi Takizawa, Tokyo (JP); Kenichiro Yokota, Tokyo (JP)

(73) Assignees: SONY CORPORATION, Tokyo (JP); SONY INTERACTIVE ENTERTAINMENT INC., Tokyo (JP)

( * ) Notice: Subject to any disclaimer, the term of this patent is extended or adjusted under 35 U.S.C. 154(b) by 45 days.

(21) Appl. No.: 15/043,870

(22) Filed: Feb. 15, 2016

(65) Prior Publication Data
US 2016/0252730 A1  Sep. 1, 2016

(30) Foreign Application Priority Data
Feb. 27, 2015  (JP) ................................ 2015-037855

(51) Int. Cl.
G09G 5/00 (2006.01)
G02B 27/01 (2006.01)
G06F 1/00 (2006.01)

(52) U.S. Cl.
CPC ............ *G02B 27/017* (2013.01); *G06F 1/00* (2013.01); *G02B 2027/014* (2013.01); *G02B 2027/0187* (2013.01)

(58) Field of Classification Search
CPC .. G02B 27/01; G02B 27/017; G02B 27/0172; G02B 27/0176; G02B 2027/0132; G02B 2027/014; G02B 2027/0187; G06F 3/011; G06F 3/012; G06F 3/013
See application file for complete search history.

(56) References Cited

U.S. PATENT DOCUMENTS

| 5,825,456 A * | 10/1998 | Tabata ............... H04N 13/0055 348/51 |
| 5,856,843 A * | 1/1999 | Muramoto ......... H04N 13/0003 348/51 |
| 6,522,312 B2 * | 2/2003 | Ohshima ................. A63F 13/00 273/309 |

(Continued)

*Primary Examiner* — Joe H Cheng
(74) *Attorney, Agent, or Firm* — Katten Muchin Rosenman LLP

(57) ABSTRACT

An image generating system includes a first attitude data obtaining unit obtaining first attitude data indicating an attitude of a head-mounted display in first timing; a reference image generating unit generating a reference image showing a state of looking at a virtual three-dimensional space from a viewpoint, a position and a sight line direction of the viewpoint being identified on a basis of the first attitude data; a second attitude data obtaining unit obtaining second attitude data indicating the attitude of the head-mounted display in second timing; a corresponding position identifying unit identifying a corresponding position for each pixel within a display image to be displayed on the head-mounted display; a pixel value identifying unit identifying a pixel value of the pixel within the display image, the pixel being associated with the corresponding position; and a display image generating unit generating the display image.

7 Claims, 10 Drawing Sheets

(56) References Cited

U.S. PATENT DOCUMENTS

| | | | | |
|---|---|---|---|---|
| 6,757,441 | B1* | 6/2004 | Katayama | G06T 9/007 |
| | | | | 382/248 |
| 7,106,324 | B1* | 9/2006 | Takahashi | G06T 15/30 |
| | | | | 345/423 |
| 7,532,224 | B2* | 5/2009 | Bannai | A63F 13/00 |
| | | | | 345/156 |
| 9,292,764 | B2* | 3/2016 | Yun | G06K 9/6201 |
| 2001/0036307 | A1* | 11/2001 | Hanna | G06T 5/50 |
| | | | | 382/154 |
| 2002/0075286 | A1* | 6/2002 | Yonezawa | G02B 27/017 |
| | | | | 345/679 |
| 2005/0024388 | A1* | 2/2005 | Takemoto | G06T 19/006 |
| | | | | 345/633 |
| 2006/0050069 | A1* | 3/2006 | Okuno | G06F 3/04815 |
| | | | | 345/419 |
| 2007/0046776 | A1* | 3/2007 | Yamaguchi | H04N 13/0059 |
| | | | | 348/53 |
| 2011/0140994 | A1* | 6/2011 | Noma | G02B 27/017 |
| | | | | 345/8 |
| 2015/0116473 | A1* | 4/2015 | Yasuda | G06Q 30/0242 |
| | | | | 348/78 |
| 2015/0163473 | A1* | 6/2015 | Osawa | H04N 13/044 |
| | | | | 348/53 |
| 2016/0209663 | A1* | 7/2016 | Hirokawa | G02B 27/0101 |
| 2016/0239252 | A1* | 8/2016 | Nakagawa | G06F 3/012 |
| 2017/0083084 | A1* | 3/2017 | Tatsuta | G06F 3/048 |

\* cited by examiner

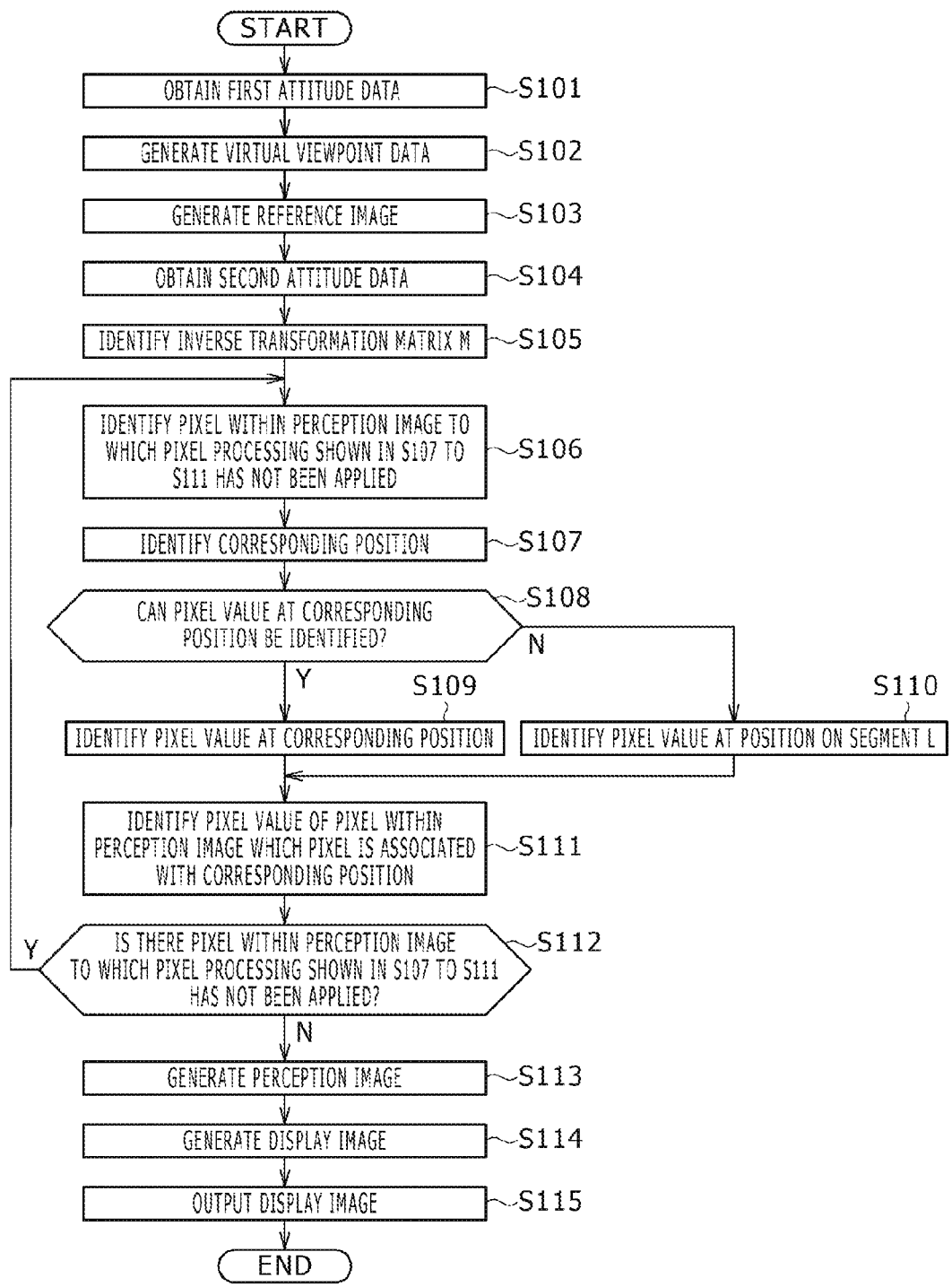

IMAGE GENERATING SYSTEM, IMAGE GENERATING METHOD, AND INFORMATION STORAGE MEDIUM

BACKGROUND

The present technology relates to an image generating system, an image generating method, and an information storage medium.

Head-mounted displays (HMDs) have recently spread which can display an image showing a state of looking in a sight line direction from a viewpoint disposed within a virtual three-dimensional apace. Such HMDs include an HMD that allows the position of the viewpoint and the sight line direction to be identified on the basis of the attitude of the HMD so that an observer can feel as if the observer were within the virtual three-dimensional space.

SUMMARY

It takes a certain time to display an image according to the attitude of the HMD after identifying the attitude of the HMD. There is thus a certain degree of difference between the attitude of the HMD on which attitude the displayed image is based and the attitude of the HMD in timing in which the image is displayed. Due to this difference, the image displayed on the HMD may cause a feeling of strangeness to the observer.

For example, after the image is generated on the basis of the identified attitude of the HMD, the attitude of the HMD may be identified again, and an image obtained by subjecting the generated image to a transformation such as an affine transformation on the basis of a difference between the identified attitudes may be displayed. This reduces the feeling of strangeness that the image displayed on the HMD causes to the observer.

However, in order to reduce a load of image processing, the generated image generally has a size corresponding approximately to a visual field range of the observer. Because of the thus limited size of the generated image, a pixel whose pixel value is not identified from the image before the transformation may be included in the image after the transformation.

The pixel value of the pixel whose pixel value is not identified from the image before the transformation may be set to a predetermined value, for example. However, this results in an unnatural image after the transformation. As a result, the image displayed on the HMD also causes a feeling of strangeness to the observer.

The present technology has been made in view of the actual situation. It is desirable to provide an image generating system, an image generating method, a program, and an information storage medium that can reduce, more than in the past, a feeling of strangeness caused to an observer by an image that is displayed on an HMD and which shows a state of looking in a sight line direction from a viewpoint disposed within a virtual three-dimensional space.

According to an embodiment of the present technology, there is provided an image generating system including: a first attitude data obtaining unit obtaining first attitude data indication an attitude of a head-mounted display in first timing; a reference image generating unit generating a reference image shoving a state of looking at a virtual three-dimensional space from a viewpoint, a positron and a sight line direction of the viewpoint being identified on a basis of the first attitude data; a second attitude data obtaining unit obtaining second attitude data indicating the attitude of the head-mounted, display in second timing subsequent to the first timing; a corresponding position identifying unit identifying a corresponding position for each pixel within a display image to be displayed on the head-mounted display, the corresponding position being a position on a plane including the reference image and being associated with the pixel, on a basis of a difference between the attitude indicated by the first attitude data and the attitude indicated by the second attitude data; a pixel value identifying unit identifying a pixel value of the pixel within the display image, the pixel being associated with the corresponding position, on a basis of one or more pixel values of one or more corresponding pixels within the reference image, the one or more corresponding pixels being selected on a basis of the corresponding position; and a display image generating unit generating the display image on a basis of the pixel value identified for each pixel within the display image; according to presence or absence of the one or more corresponding pixels within the reference image, the one or more corresponding pixels being selected on the basis of the corresponding position, the pixel value identifying unit controlling whether or not to identify the pixel value of the pixel within the display imago, the pixel being associated with the corresponding position, on a basis of one or more pixel values of one or more corresponding pixels within the reference image, the one or more corresponding pixels being selected on a basis of a position on a segment connecting the corresponding position to a position of a reference point within the reference image.

In addition, according to an embodiment of the present technology, there is provided an image generating method including: obtaining first attitude data indicating an attitude of a head-mounted display in first timing; generating a reference image showing a state of looking at a virtual three-dimensional space from a viewpoint, a position and a sight line direction of the viewpoint being identified on a basis of the first attitude data; obtaining second attitude data indicating the attitude of the head-mounted display in second timing subsequent to the first timing; identifying a corresponding position for each pixel within a display image to be displayed on the head-mounted display, the corresponding position being a position on a plane including the reference image and being associated with the pixel, on a basis of a difference between the attitude indicated by the first attitude data and the attitude indicated by the second attitude data; identifying a pixel value of the pixel within the display image, the pixel being associated with the corresponding position, on a basis of one or more pixel values of one or more corresponding pixels within the reference image, the one or more corresponding pixels being selected on a basis of the corresponding position; and generating the display image on a basis of the pixel value identified for each pixel within the display image; in the identifying of the pixel value, according to presence or absence of the one or more corresponding pixels within the reference image, the one or mere corresponding pixels being selected on the basis of the corresponding position, control being performed as to whether or not to identify the pixel value of the pixel within the display image, the pixel being associated with the corresponding position, on a basis of one or more pixel values of one or more corresponding pixels within the reference image, the one or more corresponding pixels being selected on a basis of a position on a segment connecting the corresponding position to a position of a reference point within the reference image.

In addition, according to an embodiment of the present technology, there is provided a computer readable information storage medium storing a program for a computer, the program including: obtaining first attitude data indicating an attitude of a head-mounted display in first timing; generating a reference image showing a state of looking at a virtual three-dimensional space from a viewpoint, a position and a sight line direction of the viewpoint being identified on a basis of the first attitude data; obtaining second attitude data indicating the attitude of the head-mounted display in second timing subsequent to the first timing; identifying a corresponding position for each pixel within a display image to be displayed on the head-mounted display, the corresponding position being a position on a plane including the reference image and being associated with the pixel, on a basis of a difference between the attitude indicated by the first attitude data and the attitude indicated by the second attitude data; identifying a pixel value of the pixel within the display image, the pixel being associated with the corresponding position, on a basis of one or more pixel values of one or more corresponding pixels within the reference image, the one or more corresponding pixels being selected on a basis of the corresponding position; and generating the display image on a basis of the pixel value identified for each pixel within the display image; in the identifying of the pixel value, according to presence or absence of the one or more corresponding pixels within the reference image, the one or more corresponding pixels being selected on the basis of the corresponding position, control being performed as to whether or not to identify the pixel value of the pixel within the display image, the pixel being associated with the corresponding position, on a basis of one or more pixel values of one or more corresponding pixels within the reference image, the one or more corresponding pixels being selected on a basis of a position on a segment connecting the corresponding position to a position of a reference point within the reference image.

In one mode of the present technology, according to the presence or absence of the one or more corresponding pixels within the reference image, the one or more corresponding pixels being selected on the basis of the corresponding position, the pixel value identifying unit controls whether or not to identify the pixel value of the pixel within the display image, the pixel being associated with the corresponding position, on a basis of one or more pixel values of one or more corresponding pixels within the reference image, the one or more corresponding pixels being selected on a basis of a position of a point of intersection of the segment connecting the corresponding position to the reference point within the reference image and an edge of the reference image.

Alternatively, according to the presence or absence of the one or more corresponding pixels within the reference image, the one or more corresponding pixels being selected on the basis of the corresponding position, the pixel value identifying unit controls whether or not to identify the pixel value of the pixel within the display image, the pixel being associated with the corresponding position, on a basis of one or more pixel values of one or more corresponding pixels within the reference image, the one or more corresponding pixels being selected on a basis of a position of a point symmetric to the corresponding position with respect to a point of intersection of the segment connecting the corresponding position to the position of the reference point within the reference image and an edge of the reference image.

In addition, in one mode of the present technology, the reference point within the reference image is a center point of the reference image.

In this mode, the reference image may be a circular image.

BRIEF DESCRIPTION OF THE DRAWINGS

FIG. 12 is a flowchart showing an example of a flow of processing performed by the image generating system according to the embodiment of the present technology.

DETAILED DESCRIPTION OF THE PREFERRED EMBODIMENT

One embodiment of the present technology will hereinafter be described with reference to the drawings.

Figure 1:
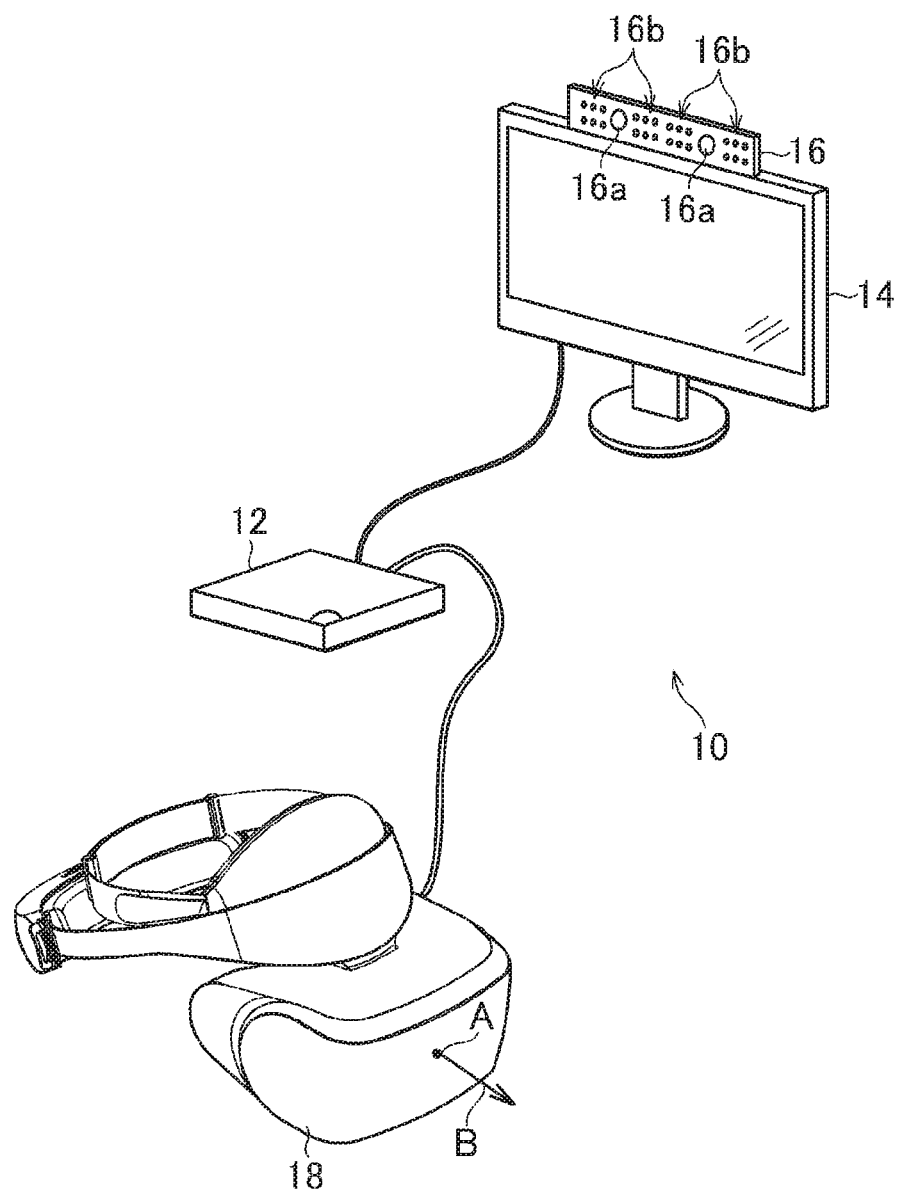
FIG. 1 is a diagram showing an example of a general constitution of an image processing system according to one embodiment of the present technology.

FIG. 1 is a diagram showing an example of a general constitution of an image processing system 10 according to one embodiment of the present technology. As shown in FIG. 1, the image processing system 10 according to the present embodiment includes an image generating system 12, a display 14, a camera and microphone unit 16, and an HMD 18.

Figure 2:
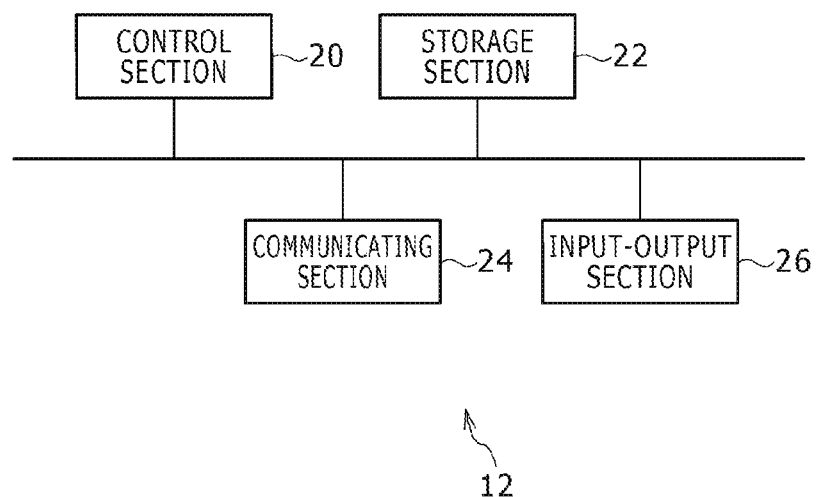
FIG. 2 is a diagram showing an example of a hardware configuration of an image generating system according to the embodiment of the present technology.

The image generating system 12 according to the present embodiment is for example a computer of an entertainment device such as a game console. As shown in FIG. 2, for example, the image generating system 12 includes a control section 20, a storage section 22, a communicating section 24, and an input-output section 26. The control section 20 is for example a program control device such as a central processing unit (CPU) that operates according to a program installed on the image generating system 12. The control section 20 according to the present embodiment includes a graphics processing unit (GPU) that renders an image in a frame buffer on the basis of a graphics command and data supplied from the CPU. The storage section 22 is for example a storage element such as a read-only memory (ROM), a random-access memory (RAM), or the like, a hard disk drive, or the like. The storage section 22 stores a program executed by the control section 20 and the like. The area of a frame buffer in which the GPU renders an image is secured in the storage section 22 according to the present embodiment. The communicating section 24 is for example a communication interface such as an Ethernet (registered trademark) module, a wireless local area network (LAN) module, or the like. The input-output section 26 is for example an input-output port such as a high-definition multimedia interface (HDMI) (registered trademark) port, a universal aerial bus (USB) port, or the like.

The display 14 according to the present embodiment is for example a liquid crystal display or the like. The display 14 displays a screen generated by the image generating system 12 or the like. The display 14 according to the present embodiment includes a speaker that outputs sound represented by audio data generated by the image generating system 12.

The camera and microphone unit 16 according to the present embodiment includes for example cameras 16a that output an image obtained by imaging a subject to the image generating system 12 and microphones 16b that obtain ambient sound, convert the sound into audio data, and then output the audio data to the image generating system 12.

Figure 3:
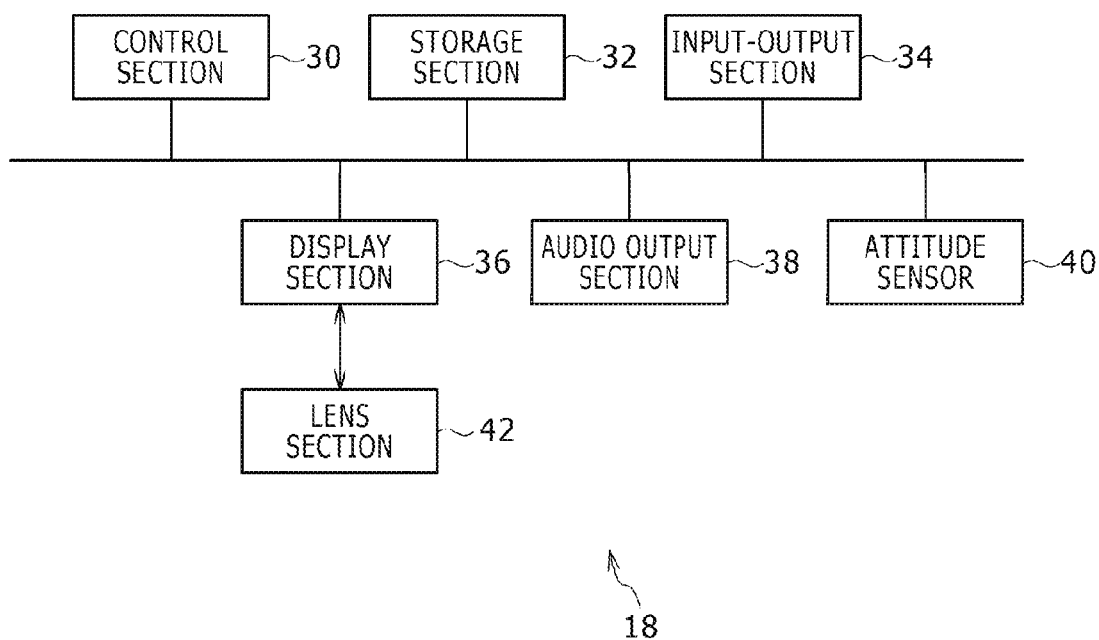
FIG. 3 is a diagram showing an example of a configuration of a head-mounted display according to the embodiment of the present technology.
Figure 4:
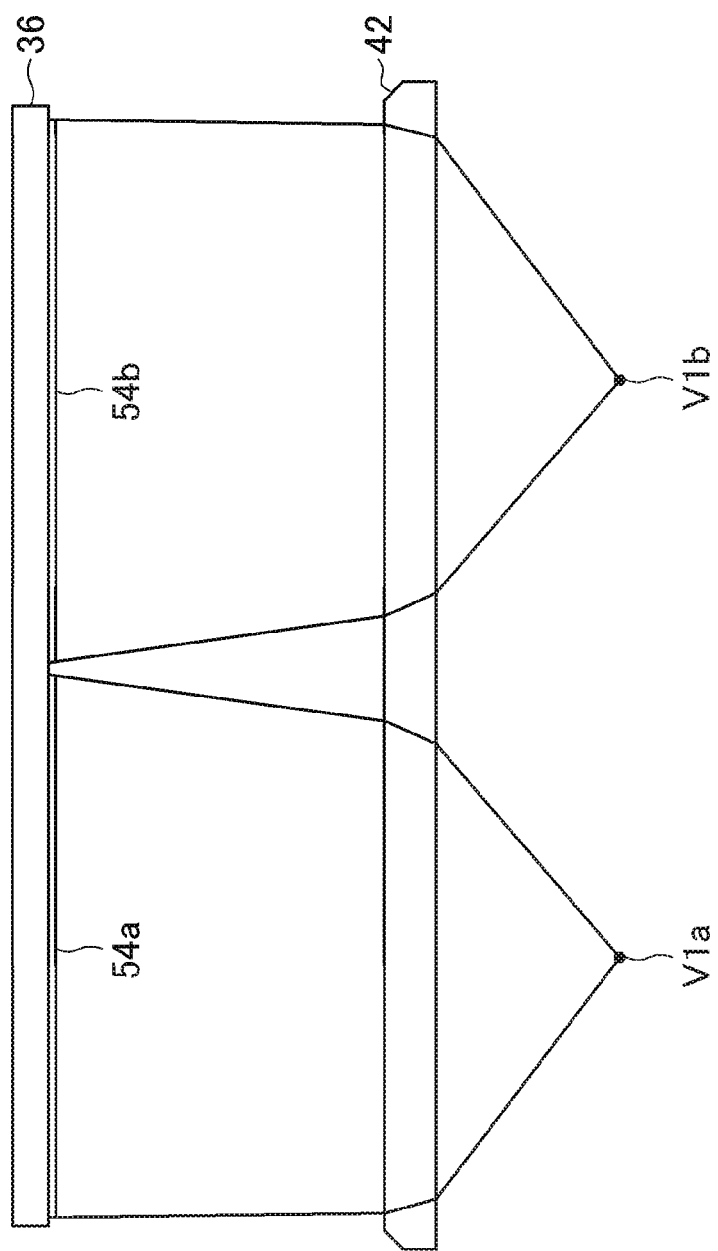
FIG. 4 is a diagram showing an example of a configuration or the head-mounted display according to the embodiment of the present technology.

As shown in FIG. 3 and FIG. 4, for example, the HMD 18 according to the present embodiment includes a control section 30, a storage section 32, an input-output section 34, a display section 36, an audio output section 38, an attitude sensor 40, and a lens section 42. The control section 30 is for example a program control device such as a CPU that operates according to a program installed on the HMD 18. The storage section 32 is for example a storage element such as a ROM, a RAM, or the like, a hard disk drive, or the like. The storage section 32 stores a program executed by the control section 30 and the like. The input-output section 34 is for example an input-output port such as an HDMI port, a USB port, or the like. The display section 36 is for example a display such as a liquid crystal display, an organic electroluminescence (EL) display, or the like. The display section 36 displays a screen generated by the image generating system 12 or the like. The audio output section 38 is for example a speaker or the like. The audio output section 38 outputs sound represented by audio data generated by the image generating system 12. The attitude sensor 40 is for example a sensor such as an acceleration sensor, a gyro sensor, or the like. The attitude sensor 40 measures the attitude of the HMD 18. As shown in FIG. 4, for example, the lens section 42 is a lens disposed between a viewpoint V1 (a viewpoint V1a of a left eye and a viewpoint V1b of a right eye) of a user viewing an image displayed on the display section 36 and the display section 36. Incidentally, the lens section 42 may be formed by one lens, or may be formed by a plurality of lenses arranged along the sight line direction of the user. In addition, a lens for the left eye and a lens for the right eye may be integral with each other, or may be separate from each other.

The image generating system 12 and the display 14 are for example connected to each other via an HDMI cable or the like. The image generating system 12 and the camera and microphone unit 16 are for example connected to each other via an HDMI cable, a USB cable, or the like. In addition, the image generating system 12 and the HMD 13 are for example connected to each other via an HDMI cable, a USB cable, or the like.

Figure 5:
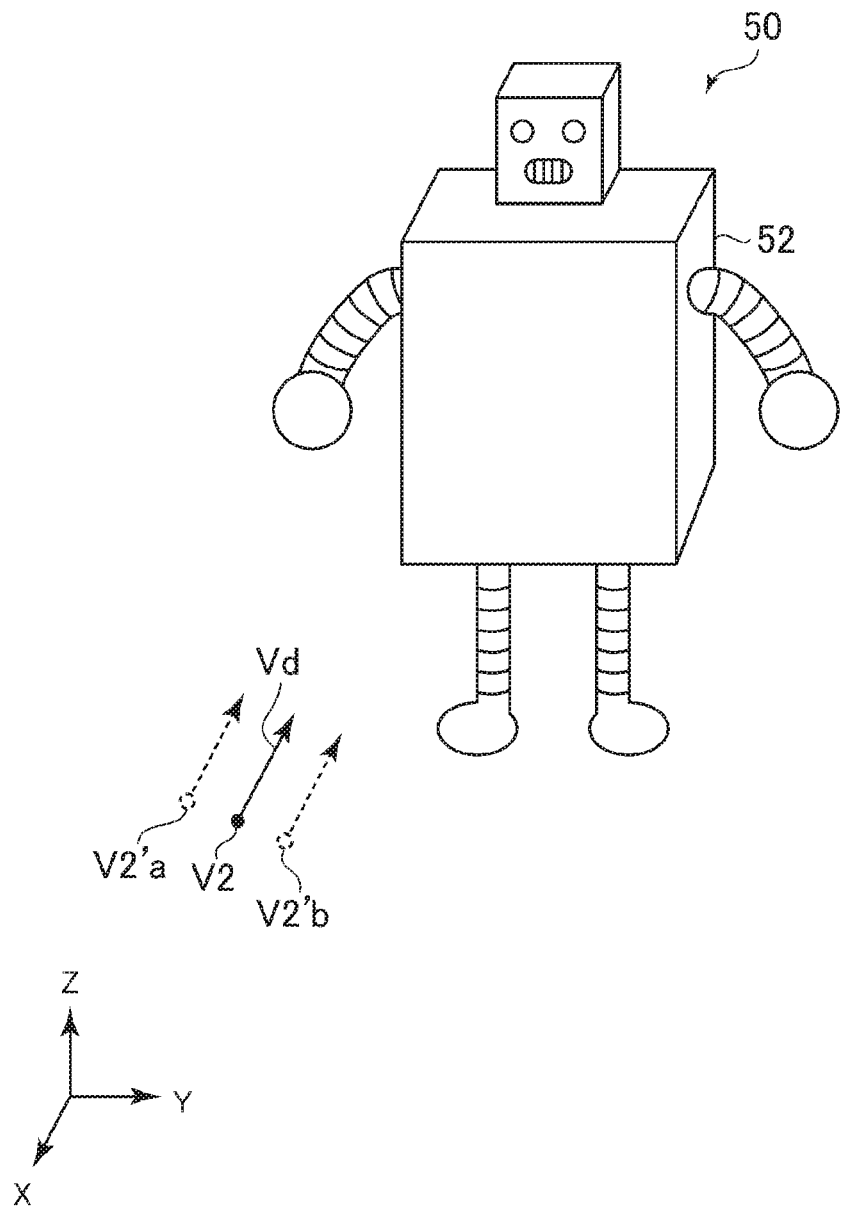
FIG. 5 is a diagram showing an example of a virtual space.

In the present embodiment, for example, the display section 36 of the HMD 18 displays an image showing a state of looking in a virtual sight line direction Vd from a virtual viewpoint V2 disposed within a virtual space 50 illustrated in FIG. 5. The virtual space 50 according to the present embodiment is for example a virtual three-dimensional space in which a virtual object 52 formed by a plurality of polygons is disposed. The image displayed on the display section 36 of the HMD 18 will hereinafter be referred to as a display image 54 (see FIG. 4 and the like). In addition, data representing the position coordinates of the viewpoint V2 and the sight line direction Vd will hereinafter be referred to as virtual viewpoint data.

In the present embodiment, a display image 54a for the left eye and a display image 54b for the right eye are generated on the basis of the position of the viewpoint V2 and the sight line direction Vd, and are displayed in respective predetermined positions of the display section 36, as shown in FIG. 4. In the present embodiment, for example, the display image 54a for the left eye is displayed on the display section 36 such that the center point of the display image 54a is disposed on the optical axis of the lens for the left eye. In addition, in the present embodiment, for example, the display image 54b for the right eye is displayed or, the display section 36 such that the center point of the display image 54b is disposed on the optical axis of the lens for the right eye. Then, the display image 54a for the left eye is perceived by the left eye of the user through the lens for the left eye, and the display image 54b for the right eye is perceived by the right eye of the user through the lens for the right eye. Incidentally, the center of the display image 54a for the left eye may not be on the optical axis of the lens for the left eye. In addition, the center of the display image 54b for the right eye may not be on the optical axis of the lens for the right eye. In addition, the gaze direction of the user may coincide with the direction of the optical axes of the lenses. In addition, the gaze direction of the user may not coincide with the direction of the optical axes of the lenses.

In the present embodiment, the display image 54a for the left eye is an image showing a state of looking in the sight line direction Vd from a position (position of a left viewpoint V2'a shown in FIG. 5) shifted to the left by a predetermined length with respect to the position of the viewpoint V2 disposed in the virtual space 50. The display image 54b for the right eye is an image showing a state of looking in the sight line direction Vd from a position (position of a right viewpoint V2'b shown in FIG. 5) shifted to the right by the predetermined length with respect to the position of the viewpoint V2 disposed in the virtual space 50.

In the present embodiment, the attitude of the HMD 18 and the values of the virtual viewpoint data are associated with each other. Therefore, for example, when the user turns to the left or right in a state of wearing the HMD 18, the sight line direction Vd turns to the left or right in such a manner as to be interlocked with the turning of the user. In addition, for example, when the user turns up or down in the state of wearing the HMD 18, the sight line direction Vd turns up or down in such a manner as to be interlocked with the turning of the user. In addition, for example, when the user moves the face to the left or right in the state of wearing the HMD 18, the position of the viewpoint V2 moves to the left or right in such a manner as to be interlocked with the movement of the user. In addition, for example, when the user moves the face up or down in the state of wearing the HMD 18, the position of the viewpoint V2 moves up or down in such a manner as to be interlocked with the movement of the user.

In the present embodiment, attitude data indicating the attitude of the HMD 18 is generated on the basis of a result of measurement of the attitude of the HMD 18 by the attitude sensor 40 included in the HMD 18. The attitude data in the present embodiment for example includes the value of position coordinates of a point A and the value of a normal vector B, the point A and the normal vector B being shown in FIG. 1. In this case, for example, the position coordinates of the point A are position coordinates of a predetermined point (for example the center point of the display section 36) set in the HMD 18 within a real space. In addition, the normal vector B is for example a vector perpendicular to a surface including the display surface of the display section 36, the vector pointing in a direction of going away from the point A. Then, in the present embodiment, for example, the attitude data generated by the attitude sensor 40 is output from the HMD 18 to the image generating system 12.

In the present embodiment, the attitude of the HMD 18 is identified periodically at predetermined time intervals. The attitude data is therefore generated periodically at predetermined time intervals.

Incidentally, the attitude of the HMD 18 may be identified on the basis of images of the HMD 18 photographed by the cameras 16a. In this case, for example, the images of the HMD 18 photographed by the cameras 16a are output from the camera and microphone unit 16 to the image generating system 12. The image generating system 12 may then generate the attitude data on the basis of the images, for example. In addition, the attitude data may be generated on the basis of the result of measurement by the attitude sensor 40 and the images of the HMD 18 photographed by the cameras 16a.

In the present embodiment, the values of the virtual viewpoint data are associated with the values of the attitude data indicating the attitude of the HMD 16. Therefore, in the present embodiment, for example, the values of the virtual viewpoint data can be uniquely identified on the basis of the values of the attitude data.

The generation and display of the display image 54 according to the present embodiment will hereinafter be further described with reference to FIG. 6. Incidentally, the following contents apply to both of the generation and display of the display image 54a for the left eye and the generation and display of the display image 54b for the right eye.

Figure 6:
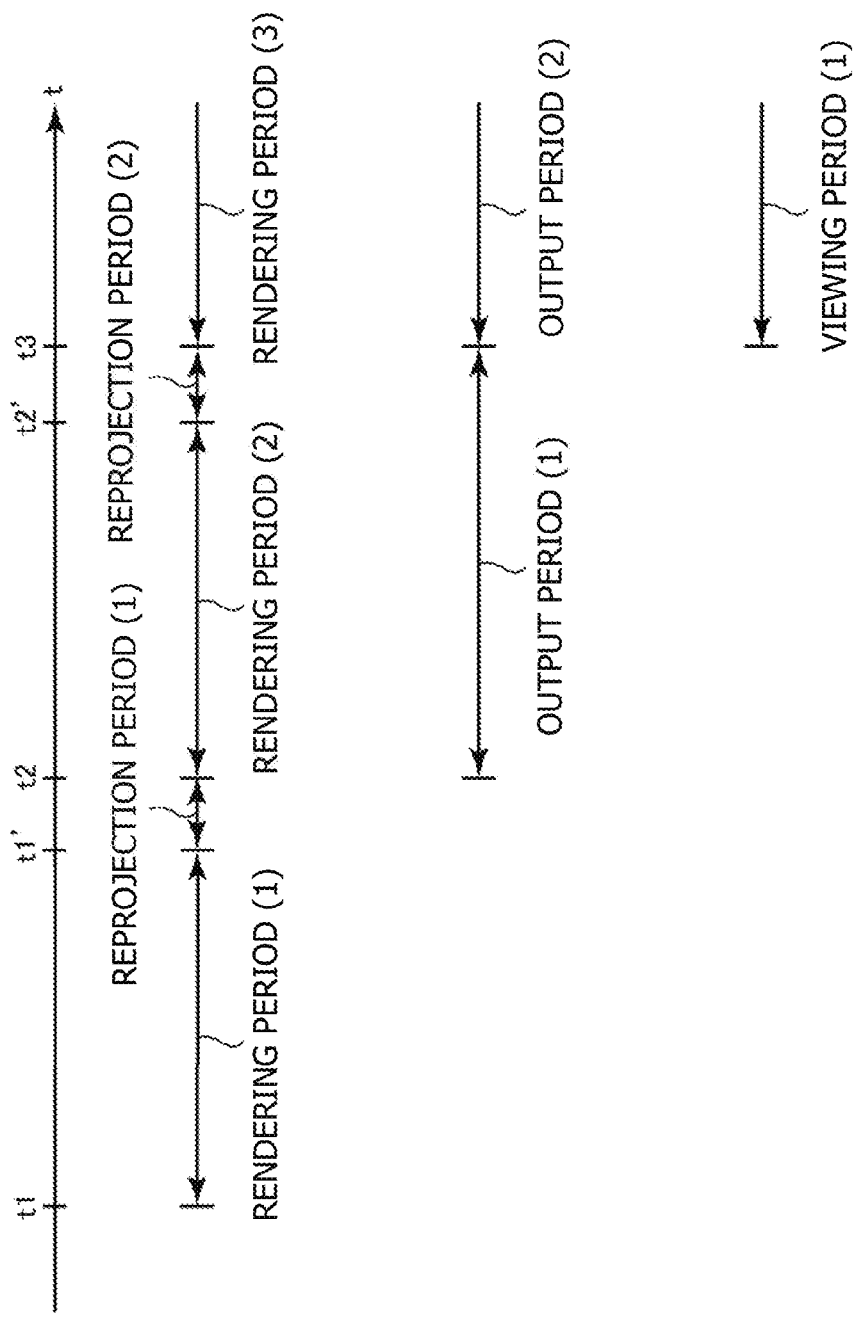
FIG. 6 is a diagram of assistance in explaining an example of generation and display of a display image in the embodiment of the present technology.

Timing t1, timing t2, and timing t3 shown in FIG. 6 each represent vertical synchronization timing (VSYNC timing) of the display section 36.

Figure 7:
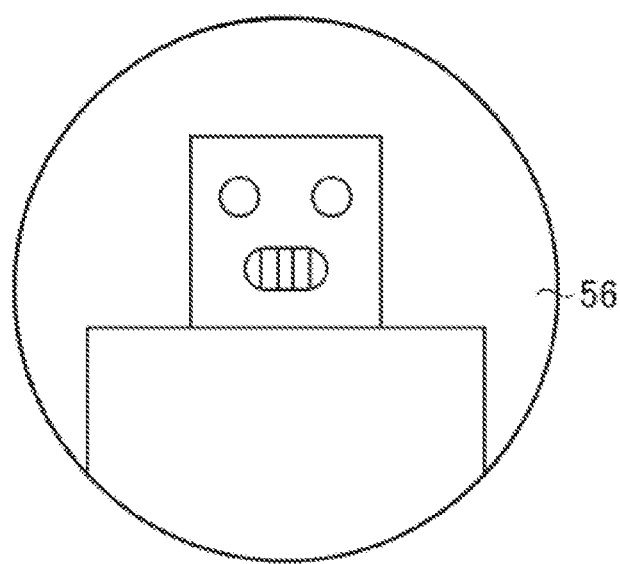
FIG. 7 is a diagram showing an example of a reference image.

In the present embodiment, for example, a reference image 56 illustrated in FIG. 7 is generated in a rendering period (1) from the tiding t1 to timing t1' on the basis of the attitude data indicating the attitude of the HMD 18 in the timing t1. Incidentally, suppose in this case that the timing t1' is timing after the timing t1 and before the timing t2.

In the present embodiment, for example, virtual viewpoint data in the timing t1 is generated on the basis of the attitude data in the timing t1. The reference image 56 is then rendered on the basis of the generated virtual viewpoint data. In this case, an image showing a state of Looking in the sight line direction Vd from the viewpoint V2'a in the timing t1 is rendered at a time of generation of a reference image 56 for the left eye. In addition, an image showing a state of looking in the sight line direction Vd from the viewpoint V2'b in the timing t1 is rendered at a time of generation of a reference image 56 for the right eye.

In the present embodiment, in order to save the number of rendered pixels, clipping processing using a stencil buffer is performed in the generation of the reference image 56. As a result, the reference image 56 illustrated in FIG. 7 has a circular shape. Incidentally, while the reference image 56 illustrated in FIG. 7 has a circular shape, the reference image 56 may have for example a polygonal shape such as an octagonal shape.

Then, in the present embodiment, for example, in a reprojection period (1) from the timing t1' to the timing t2, a display image 54 is generated on the basis of the reference image 56 generated as described above.

Figure 8:
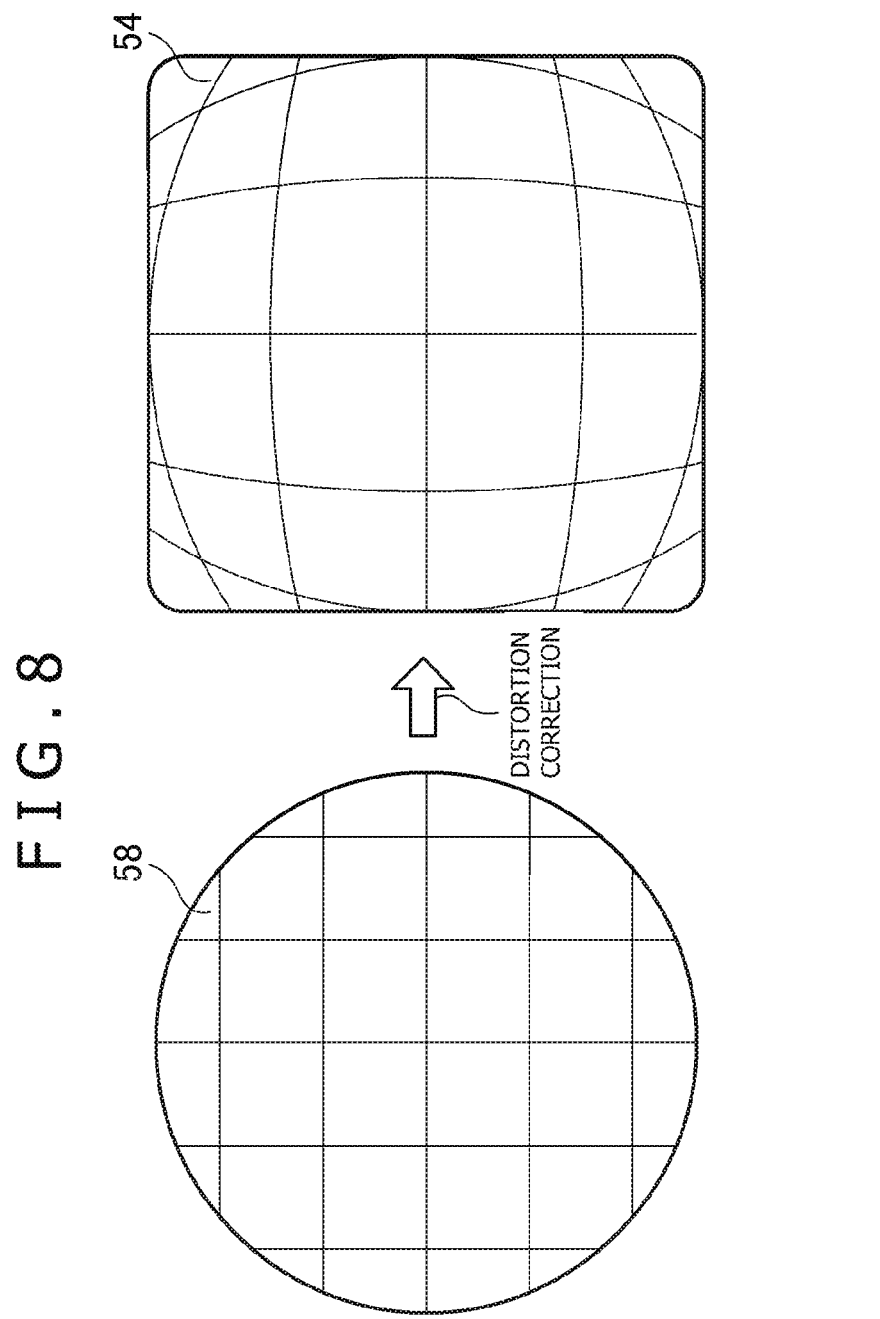
FIG. 8 is a diagram of assistance in explaining an example of a transformation (distortion correction) from a perception image to the display image.

The display image 54 according to the present embodiment is an image obtained by performing distortion correction on a perception image 58 as shown in FIG. 8. Then, in the present embodiment, for example, when the user views the display image 54 displayed on the display section 36 through the lens section 42, the user sees an image such as the perception image 58 or the like, which is the display image 54 before the distortion correction is performed. Incidentally, in the present embodiment, the perception image 58 has the same shape as the reference image 56.

Figure 9:
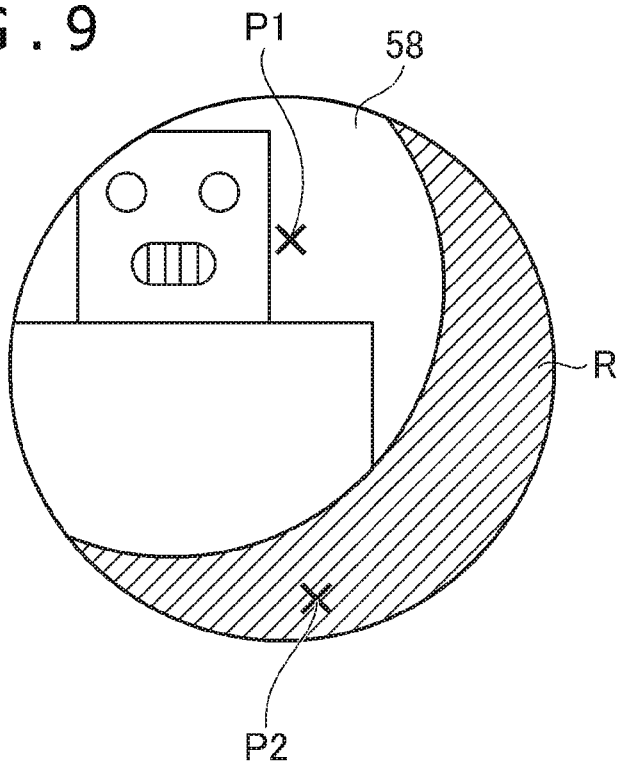
FIG. 9 is a diagram showing an example of the perception image.

FIG. 9 is a diagram showing an example of the perception image 58 according to the present embodiment. The perception image 58 shown in FIG. 9 is for example an image obtained by performing publicly known reprojection processing on the reference image 56 shown in FIG. 7. In the present embodiment, for example, the perception image 58 is generated by subjecting the reference image 56 to a transformation such as an affine transformation according to a difference between an attitude indicated by the attitude data in the timing t1 and an attitude indicated by the attitude data in the timing t1'.

The perception image 58 in this case corresponds to an image showing a state of looking in the sight line direction Vd that can be identified on the basis of the attitude data in the timing t1' from the viewpoint V2'a or the viewpoint V2'b that can be identified on the basis of the attitude data. However, the present embodiment does not perform rendering using the virtual viewpoint data identified on the basis of the attitude data in the timing t1', but performs transformation of the reference image 56 generated on the basis of the attitude data in the timing t1.

For each pixel within the perception image 58, the present embodiment identifies a corresponding position that is a position on a plane including the reference image 56 and which is associated with the pixel. In this case, for example, the position coordinates of a position P1 within the perception image 58 are subjected to inverse transformation of the above-described transformation. A position P1' within the reference image 56 illustrated in FIG. 10 is thereby identified as the corresponding position associated with the position P1.

Then, in the present embodiment, the pixel value of a pixel at the position P1 within the perception image 58 is identified on the basis of a pixel value at the position P1' within the reference image 56. The present embodiment uses for example a publicly known interpolation method such as nearest neighbor interpolation, bilinear interpolation, bicubic interpolation, or the like to identify the pixel value at the position P1'. Then, the present embodiment for example selects one or more pixels within the reference image 56 which one or more pixels are necessary to identify the pixel value at the position P1' in the interpolation method being used. The present embodiment then identifies the pixel value at the position P1' on the basis of one or more pixel values of the selected one or more pixels. The present embodiment then identifies the identified pixel value at the position P1' as the pixel value of the pixel at the position P1 within the perception image 58.

In the present embodiment, depending on the difference between the attitude indicated by the attitude data in the timing t1 and the attitude indicated by the attitude data in the timing t1', there may not be one or more pixels within the reference image 56 which one or more pixels are necessary to identify the pixel value at the corresponding position in the interpolation method being used. For example, there is not one or more pixels within the reference image 56 which one or more pixels are necessary to identify a pixel value at a position P2' shown in FIG. 10, the position P2' being a corresponding position corresponding to a pixel at a position P2 included in a hatched region R in FIG. 9. When at least one pixel within the reference image 56 which at least one pixel is necessary to identify the pixel value at the corresponding position in the interpolation method being used is not identified as in this case, for example, it is difficult to identify the pixel value at the corresponding position by the interpolation method.

Figure 10:
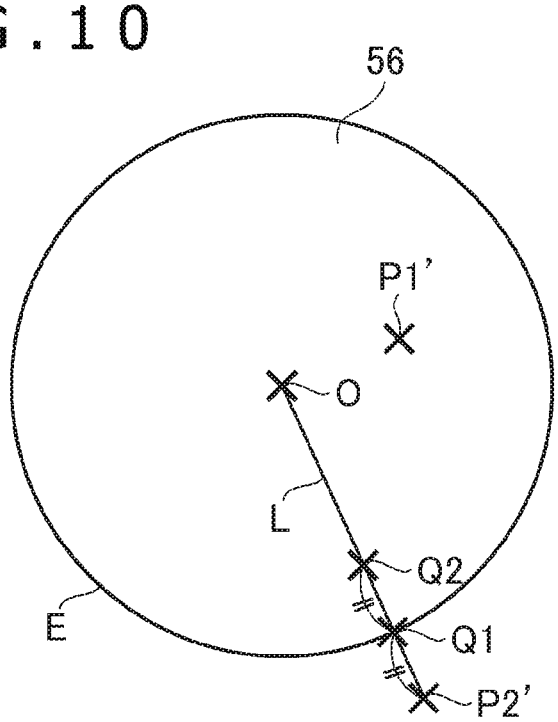
FIG. 10 is a diagram of assistance in explaining an example of identification of a pixel value at a corresponding position.

When there is not one or more pixels within the reference image 56 which one or more pixels are necessary to identify the pixel value at the position P2' in the interpolation method being used, the present embodiment identifies a segment L connecting the position P2' to a reference point within the reference image 56 (which reference point is for example a center point O of the reference image 56), as shown in FIG. 10. Then, a pixel value at a position on the segment L identified as described above is identified as the pixel value of the pixel at the position P2 within the perception image 58. In this case, for example, a pixel value at the position of a point of intersection Q1 of the segment L and an edge E of the reference image 56 may be identified as the pixel value of the pixel at the position P2. Alternatively, for example, a pixel value at the position of a point Q2 symmetric to the position P2' with respect to the point of intersection Q1 may be identified as the pixel value of the pixel at the position P2. In this case, for example, as described above, one or more pixels within the reference image 56 are selected which are necessary to identify the pixel value at the position on the segment L, such as the pixel value at the position of the point of intersection Q1, the pixel value at the position of the point Q2, or the like. Then, in the present embodiment, the pixel value identified on the basis of one or more pixel values of the selected one or more pixels is identified as the pixel value of the pixel at the position P2 within the perception image 58. Incidentally, in this case, for example, a pixel value at a position within the reference image 56 which position with respect to the image is the same as the position P2 within the perception image 58 may be identified as the pixel value of the pixel at the position P2 within the perception image 58. That is, for example, a pixel value at a position within the reference image 56 which position have same coordinate values with respect to the image as the position P2 within the perception image 53 may be identified as the pixel value of the pixel at the position P2 within the perception image 58.

The perception image 58 is then generated on the basis of the pixel value identified as described above. The display image 54 is then generated by performing distortion correction on the generated perception image 58.

Incidentally, a combined transformation of the transformation from the reference image 56 to the perception image 58 and the transformation (distortion correction) from the perception image 58 to the display image 51 can be defined. Therefore, for example, for each pixel within the display image 54, a corresponding position that is a position on the plane including the reference image 56 and which is associated with the pixel can be identified. Accordingly, as in the foregoing, the pixel value of each pixel within the display image 54 may be identified on the basis of the reference image 56. This enables the display image 54 to be generated on the basis of the reference image 56 without the perception image 58 being generated.

In the present embodiment, the display image 54 generated as described above is written to the frame buffer of the image generating system 12. The display image 54 written to the frame buffer is then output to the HMD 18.

The display image 54 output to the HMD 18 in the reprojection period (1) is displayed on the display section 36 for an output period (1) from the timing t2 to the timing t3. The user then perceives the displayed display image 54 in a viewing period (2) after the timing t3.

Similarly, in a rendering period (2) from the timing t2 to timing t2' shown in FIG. 6, a reference image 56 is generated on the basis of attitude data indicating the attitude of the HMD 18 in the timing t2. Suppose in this case that the timing t2' is timing after the timing t2 and before the timing t3. Then, in a reprojection period (2) from the timing t2' to the timing t3 shown in FIG. 6, a display image 54 is generated on the basis of the generated reference image 56 and output to the HMD 18. The display image 54 output to the HMD 18 in the reprojection period (2) is then displayed on the display section 36 in an output period (2) after the timing t3 shown in FIG. 6. The user thereafter perceives the displayed display image 54. In addition, similarly, in a rendering period (3) from the timing t3 onward as shown in FIG. 6, a reference image 56 is generated on the basis of attitude data indicating the attitude of the HMD 18 in the timing t3.

As described above, in the present embodiment, a feeling of strangeness given, to the user viewing the display image 54 is reduced as compared with a case where pixels having a predetermined value as pixel values thereof, such as black pixels, white pixels, or the like, are arranged within the region R shown in FIG. 9 for example.

It is to be noted that the above-described reference point is not limited to the center point O of the reference image 56. For example, a point within the reference image 56 which point is at a corresponding position corresponding to the position of a center point of the display image 54 or the perception image 58 may foe set as the reference point.

Functions of the image generating system 12 according to the present embodiment and processing performed by the image generating system 12 according to the present embodiment will hereinafter be further described.

Figure 11:
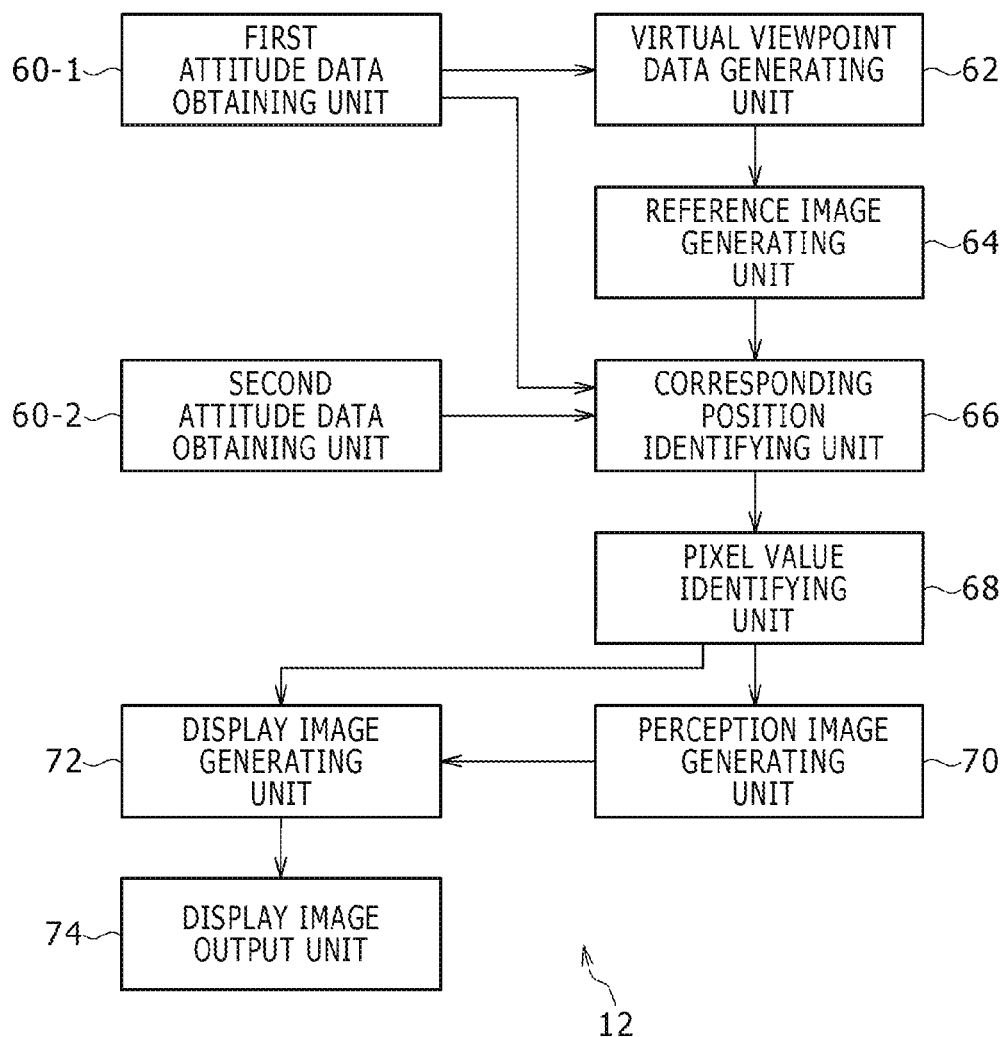
FIG. 11 is a functional block diagram showing an example of functions implemented by the image generating system according to the embodiment of the present technology.

FIG. 11 is a functional block diagram showing an example of functions implemented by the image generating system 12 according co the present embodiment. Incidentally, the image generating system 12 according to the present, embodiment does not need to implement all of the functions shown in FIG. 11, or may implement a function other than the functions shown in FIG. 11.

As shown in FIG. 11, the image generating system 12 according to the present embodiment functionally includes for example a first attitude data obtaining unit 60-1, a second attitude data obtaining unit 60-2, a virtual viewpoint data generating unit 62, a reference image generating unit 64, a corresponding position, identifying unit 66, a pixel value identifying unit 68, a perception image generating unit 70, a display image generating unit 72, and a display image output unit 74. The first attitude data obtaining unit 60-1 and the second attitude data obtaining unit 60-2 are implemented mainly by the input-output section 26. The reference image generating unit 64, the perception image generating unit 70, and the display image generating unit 72 are implemented mainly by the control section 20 and the storage section 22. The virtual viewpoint data generating unit 62, the corresponding position identifying unit 66, and the pixel value identifying unit 69 are implemented mainly by the control section 20. The display image output unit 74 is implemented mainly by the control section 20, the storage section 22, and the input-output section 26.

The first attitude data obtaining unit 60-1 in the present embodiment for example obtains first attitude data indicating the attitude of the HMD 18 in first timing. The attitude indicated by the first attitude data obtained by the first attitude data obtaining unit 60-1 will hereinafter be referred to as a first attitude. As described above, the first attitude data obtaining unit 60-1 for example obtains the first attitude data generated by the attitude sensor 40 and output from the HMD 18. In addition, for example, the first attitude data obtaining unit 60-1 may generate the first attitude data on the basis of images of the HMD 18 photographed by the cameras 16a which images are output by the camera and microphone unit 16, and obtain the generated first attitude data.

The virtual viewpoint data generating unit 62 generates virtual viewpoint data associated with the first attitude data obtained by the first attitude data obtaining unit 60-1 on the basis of the first attitude data.

The reference image generating unit 64 in the present embodiment for example generates a reference image 56 showing a state of viewing the virtual space 50 from the viewpoint V2'a or the viewpoint V2'b whose position and sight line direction Vd are identified on the basis of the first attitude data obtained by the first attitude data obtaining unit 60-1. The reference image generating unit 64 in the present embodiment for example identifies the position of the viewpoint V2'a and the sight line direction Vd on the basis of the values of the virtual viewpoint data generated by the virtual viewpoint data generating unit 62. The reference image generating unit 64 then generates a reference image 56 for the left eye which reference image shows a state of looking in the identified sight line direction Vd from the position of the identified viewpoint V2'a. In addition, the reference image generating unit 64 in the present embodiment for example identifies the position of the viewpoint V2'b and the sight, line direction Vd on the basis of the values of the virtual viewpoint data generated by the virtual viewpoint data generating unit 62. The reference image generating unit 64 then generates a reference image 56 for the right eye which reference image shows a state of looking in the identified sight line direction Vd from the position of the identified viewpoint V2'b.

As with the first attitude data obtaining unit 60-1, the second attitude data obtaining unit 60-2 in the present embodiment for example obtains second attitude data indicating the attitude of the HMD 18 in second timing subsequent to the first timing. The attitude indicated by the second attitude data obtained by the second attitude data obtaining unit 60-2 will hereinafter be referred to as a second attitude.

The corresponding position identifying unit 66 in the present embodiment for example identifies, for each pixel within the display image 54, a corresponding position that is a position on the plane including the reference image 56 and which is associated with the pixel on, the basis of a difference between the above-described first attitude and the above-described second attitude. Incidentally, the corresponding position identifying unit 66 may identify, for each pixel within the perception image 58, a corresponding position that is a position on the plane including the reference image 56 and which is associated with the pixel, as described above.

The pixel value identifying unit 68 in the present embodiment for example identifies the pixel value of the pixel within the display image 54 which pixel is associated with the corresponding position on the basis of one or more pixel values of one or more corresponding pixels within the reference image 56, the one or more corresponding pixels being selected on the basis of the corresponding position. In addition, the pixel value identifying unit 68 in the present embodiment determines the presence or absence of the one or more corresponding pixels within the reference image 56, the one or more corresponding pixels being selected on the basis of the corresponding position, as described above. The pixel value identifying unit 68 then controls whether or not to identify the pixel value of the pixel within the display image 54 which pixel is associated with the corresponding position on the basis of a pixel value at a position on the segment L shown in FIG. 10 according to the determined presence or absence, as described above. Specifically, for example, control is performed as to whether or not to identify the pixel value of the pixel within the display image 54 which pixel is associated with the corresponding position on the basis of the pixel value of the pixel at the point Q1 or the point Q2 shown in FIG. 10. Incidentally, the pixel value identifying unit 68 way identify the pixel value of the pixel within the perception image 58 which pixel is associated with the corresponding position on the basis of one or more pixel values of one or more corresponding pixels within the reference image 56, the one or more corresponding pixels being selected on the basis of the corresponding position, as described above.

The perception image generating unit 70 in the present embodiment for example generates a perception image 58 on the basis of the pixel value identified for each pixel within the perception image 58 by the pixel value identifying unit 68.

The display image generating unit 72 in the present embodiment for example generates a display image 54 by performing distortion correction on the perception image 58 generated by the perception image generating unit 70. Incidentally, as described above, the display image 54 may be generated on the basis of the reference image 56 without the perception image 58 being generated. In this case, the display image generating unit 72 generates the display image 54 on the basis of the pixel value identified for each pixel within the display image 54 by the pixel value identifying unit 68.

The display image output unit 74 outputs the display image 54 generated by the display image generating unit 72 to the HMD 18.

An example of a flow of processing for generating the display image 54 which processing is performed by the image generating system 12 according to the present embodiment will hereinafter be described with reference to a flowchart of FIG. 12. It is to be noted that the following flow applies to both of processing for generating the display image 54a and processing for generating the display image 54b. In addition, the following flow represents an example of a flow of processing in a case where the display image 54 is generated after the perception image 58 is generated.

First, the first attitude data obtaining unit 60-1 obtains first attitude data indicating the attitude of the HMD 18 in the timing t1 shown in FIG. 6 (S101).

The virtual viewpoint data generating unit 62 then generates virtual viewpoint data on the basis of the first attitude data obtained in the processing shown in S101 (S102).

The reference image generating unit 64 then generates a reference image 56 on the basis of the virtual viewpoint data generated in the processing shown in S102 (S103).

The second attitude data obtaining unit 60-2 then obtains second attitude data indicating the attitude of the HMD 18 in the timing t1' shown in FIG. 6 (S104).

The corresponding position identifying unit 66 then identifies an inverse transformation matrix M representing an inverse transformation of a transformation of the reference image 56 into a perception image 58 (S105).

The corresponding position identifying unit 66 then identifies one pixel within the perception image 58 to which pixel the following processing of S107 to S111 has not yet been applied (S106).

The corresponding position identifying unit 66 then identifies a corresponding position on the plane including the reference image 56 which corresponding position is associated with the pixel identified in the processing shown in S106 on the basis of the inverse transformation matrix M identified in the processing shown in S105 (S107).

The pixel value identifying unit 68 then determines whether or not a pixel value at the corresponding position identified in the processing shown in S107 can be identified (S108). In this case, for example, whether or not each of one or more pixels necessary to identify the pixel value at the corresponding position can be selected in a predetermined interpolation method is determined.

When determining that the pixel value at the corresponding position can be identified (S108: Y), the pixel value identifying unit 68 identifies the pixel value at the corresponding position using the predetermined interpolation method (S109). When determining that, it is difficult to identify the pixel value at the corresponding position (S108: N), on the other hand, the pixel value identifying unit 68 identifies a pixel value at a position on the segment L illustrated in FIG. 10, as described above (S110).

The pixel value identifying unit 68 then identifies the pixel value identified in the processing shown in S109 or S110 as the pixel value of the pixel within the perception image 58 which pixel is associated with the corresponding position identified in the processing shown in S107 (S111).

The pixel value identifying unit 68 then determines whether or not there is a pixel within the perception image 58 to which pixel the processing shown in S107 to S111 has not yet been applied (S112).

When there is a pixel within the perception image 58 to which pixel the processing shown in S107 to S111 has not yet been applied (S112: Y), the processing from S106 on down is performed again. When there is no pixel within the perception image 58 to which pixel the processing shown in S107 to S111 has not yet been applied (S112: N), the perception image generating unit 70 generates the perception image 58 on the basis of the pixel value of each pixel which pixel value is identified by the above processing (S113).

The display image generating unit 72 then generates a display image 54 by performing distortion correction on the perception image 58 generated in the processing shown in S113 (S114).

The display image output unit 74 then outputs the display image 54 generated in the processing shown in S114 to the HMD 18 (S115). The processing shown in the present processing example is then ended.

In the above processing example, the processing shown in S101 to S103 is performed in the rendering period (1) shown in FIG. 6, for example, and the processing shown in S104 to S115 is performed in the reprojection period (1) shown in FIG. 6, for example.

Incidentally, an inverse transformation matrix M1 representing an inverse transformation of a transformation of the reference image 56 for the left eye into the perception image 58 for the left eye and an inverse transformation matrix M2 representing an inverse transformation of a transformation of the reference image 56 for the right eye into the perception image 58 for the right eye may be identified in the above-described processing shown in S105. Then, the inverse transformation matrix M1 may be used for the generation of the display image 54a for the left eye, and the inverse transformation matrix M2 may be used for the generation of the display image 54b for the right eye.

In addition, when at least one pixel necessary to identify the pixel value at the corresponding position in the predetermined interpolation method can be selected in the above-described processing shown in S108, the pixel value identifying unit 68 may identify the pixel value at the corresponding position on the basis of the pixel value of the at least one pixel. The pixel value identifying unit 68 may then identify the identified pixel value as the pixel value of the pixel within the perception image 58 which pixel is associated with the corresponding position identified in the processing shown in S107.

The following description will be made of a case where the display image 54 is generated on the basis of the reference image 56 without the perception image 58 being generated. In this case, the inverse transformation matrix M representing an inverse transformation of a transformation of the reference image 56 into the display image 54 is identified in the above-described processing shown in S105. Then, in the processing shown in S106, one pixel within the display image 54 is identified. The processing shown in S111 then identifies the pixel value identified in the processing shown in S109 or S110 as the pixel value of the pixel within the display image 54 which pixel is associated with the corresponding position identified in the processing shown in S107. Then, without the processing shown in S113 being performed, the display image generating unit 72 generates the display image 54 on the basis of the identified pixel value of each pixel.

It is to be noted that the present technology is not limited to the foregoing embodiment.

In the above description, the present technology is applied to the image generating system 12, which is a computer of an entertainment device or the like such as a game console or the like. However, the present technology may be applied to a combination of a computer of an entertainment device or the like such as a game console and the HMD 18. That is, the functions of the present technology may be shared between devices such as a plurality of computers or the like. For example, the HMD 18 may generate at least one of the display image 54, the reference image 56, and the perception image 58.

In addition, the image generating system 12 may encode the display image 54, and then output the display image 54 to the HMD 18. The HMD 18 may then decode the display image 54 received by the HMD 18, and thereafter display the display image 54 on the display section 36.

In addition, the above concrete character strings and the concrete character strings in the drawings are illustrative, and are not limited to these character strings.

The present disclosure contains subject matter related to that disclosed in Japanese Priority Patent Application JP 2015-037855 filed in the Japan Patent Office on Feb. 27, 2015, the entire content of which is hereby incorporated by reference.

It should be understood by those skilled in the art that various modifications, combinations, sub-combinations and alterations may occur depending on design requirements and other factors insofar as they are within the scope of the appended, claims or the equivalents thereof.

What is claimed is:

1. An image generating system comprising:
    a first attitude data obtaining unit obtaining first attitude data indicating an attitude of a head-mounted display in first timing;
    a reference image generating unit generating a reference image shoving a state of looking at a virtual three-dimensional space from a viewpoint, a position and a sight line direction of the viewpoint being identified on a basis of the first attitude data;
    a second attitude data obtaining unit obtaining second attitude data indicating the attitude of the head-mounted display in second timing subsequent to the first timing;
    a corresponding position identifying unit identifying a corresponding position for each pixel within a display image to be displayed on the head-mounted display, the corresponding position being a position on a plane including the reference image and being associated with the pixel, on a basis of a difference between the attitude indicated by the first attitude data and the attitude indicated by the second attitude data;
    a pixel value identifying unit identifying a pixel value of the pixel within the display image, the pixel being associated with the corresponding position, on a basis of one or more pixel values of one or more corresponding pixels within the reference image, the one or more corresponding pixels being selected on a basis of the corresponding position; and
    a display image generating unit generating the display image on a basis of the pixel value identified for each pixel within the display image;
    according to presence or absence of the one or mere corresponding pixels within the reference image, the one or more corresponding pixels being selected on the basis of the corresponding position, the pixel value identifying unit controlling whether or not to identify the pixel value of the pixel within the display image, the pixel being associated with the corresponding position, on a basis of one or more pixel values of one or more corresponding pixels within the reference image, the one or more corresponding pixels being selected on a basis of a position on a segment connecting the corresponding position to a position of a reference point within the reference image.

2. The image generating system according to claim 1, wherein according to the presence or absence of the one or more corresponding pixels within the reference image, the one or more corresponding pixels being selected on the basis of the corresponding position, the pixel value identifying unit controls whether or not to identify the pixel value of the pixel within the display image, the pixel being associated with the corresponding position, on a basis of one or more pixel values of one or more corresponding pixels within the reference image, the one or more corresponding pixels being selected on a basis of a position of a point of intersection of the segment connecting the corresponding position to the reference point within the reference image and an edge of the reference image.

3. The image generating system according to claim 1, wherein according to the presence or absence of the one or more corresponding pixels within the reference image, the one or more corresponding pixels being selected on the basis of the corresponding position, the pixel value identifying unit controls whether or not to identify the pixel value of the pixel within the display image, the pixel being associated with the corresponding position, on a basis of one or more pixel values of one or more corresponding pixels within the reference image, the one or more corresponding pixels being selected on a basis of a position of a point symmetric to the corresponding position with respect to a point of intersection of the segment connecting the corresponding position to the position of the reference point within the reference image and an edge of the reference image.

4. The image generating system according to claim 1, wherein the reference point within the reference image is a center point of the reference image.

5. The image generating system according to claim 4, wherein the reference image is a circular image.

6. An image generating method comprising:
    obtaining first attitude data indicating an attitude of a head-mounted display in first timing;
    generating a reference image showing a state of looking at a virtual three-dimensional space from a viewpoint, a position and a sight line direction of the viewpoint being identified on a basis of the first attitude data;
    obtaining second attitude data indicating the attitude of the head-mounted display in second timing subsequent to the first timing;
    identifying a corresponding position for each pixel within a display image to be displayed on the head-mounted display, the corresponding position being a position on a plane including the reference image and being associated with the pixel, on a basis of a difference between the attitude indicated by the first attitude data and the attitude indicated by the second attitude data;
    identifying a pixel value of the pixel within the display image, the pixel being associated with the corresponding position, on a basis of one or more pixel values of one or more corresponding pixels within the reference image, the one or more corresponding pixels being selected on a basis of the corresponding position; and
    generating the display image on a basis of the pixel value identified for each pixel within the display image;
    in the identifying of the pixel value, according to presence or absence of the one or more corresponding pixels within the reference image, the one or more corresponding pixels being selected on the basis of the corresponding position, control being performed as to whether or not to identify the pixel value of the pixel within the display image, the pixel being associated with the corresponding position, on a basis of one or more pixel values of one or more corresponding pixels within the reference image, the one or more corresponding pixels being selected on a basis of a position on a segment connecting the corresponding position to a position of a reference point within the reference image.

7. A non-transitory computer readable information storage medium storing a program for a computer, the program including:
    obtaining first attitude data indicating an attitude of a head-mounted display in first timing;

generating a reference image showing a state of looking at a virtual three-dimensional space from a viewpoint, a position and a sight line direction of the viewpoint being identified on a basis of the first attitude data;

obtaining second attitude data indicating the attitude of the head-mounted display in second timing subsequent to the first timing;

identifying a corresponding position for each pixel within a display image to be displayed on the head-mounted display, the corresponding position being a position on a plane including the reference image and being associated with the pixel, on a basis of a difference between the attitude indicated by the first attitude data and the attitude indicated by the second attitude data;

identifying a pixel value of the pixel within the display image, the pixel being associated with the corresponding position, on a basis of one or more pixel values of one or more corresponding pixels within the reference image, the one or more corresponding pixels being selected on a basis of the corresponding position; and generating the display image on a basis of the pixel value identified for each pixel within the display image;

in the identifying of the pixel value, according to presence or absence of the one or more corresponding pixels within the reference image, the one or more corresponding pixels being selected on the basis of the corresponding position, control being performed as to whether or not to identify the pixel value of the pixel within the display image, the pixel being associated with the corresponding position, on a basis of one or more pixel values of one or more corresponding pixels within the reference image, the one or more corresponding pixels being selected on a basis of a position on a segment connecting the corresponding position to a position of a reference point within the reference image.

* * * * *